*INVENTOR.*
GEORGE J. DAMSZ
BY
*AGENT*

United States Patent Office 3,220,200
Patented Nov. 30, 1965

3,220,200
COOL-DOWN TIME OF INSTALLATION INCORPORATING STIRLING CYCLE REFRIGERATOR
George J. Damsz, Hastings on Hudson, N.Y., assignor to North American Philips Company, Inc., New York, N.Y., a corporation of Delaware
Filed Oct. 26, 1964, Ser. No. 406,320
6 Claims. (Cl. 62—6)

The present invention relates to an improvement in the cool-down time of an installation incorporating a Stirling cycle refrigerator on a pre-established temperature level irrespective of the heat load.

One of the objects of the present invention is to use the maximum cold production of the Stirling cycle refrigerator during the cool-down time by using the highest helium or hydrogen pressure and when the proper temperature of the cold surface is reached to thereafter diminsh the pressure to the required operating conditions.

The cold production of a Stirling cycle refrigerator is related to the pressure of the working medium which is usually helium or hydrogen. In order to achieve the shortest possible cool-down time, the helium or hydrogen pressure should be increased to the maximum permissible by the design of the cold producing Stirling type refrigerator.

Another object of the present invention is to adjust the mass flow of the recirculating compressor to the cold production of the Stirling cycle refrigerator by using an intermittent flow of recirculated gas.

The above and other features, objects and advantages of the present invention will be fully understood from the following description considered in connection with the accompanying illustrative drawings.

Figure 1:
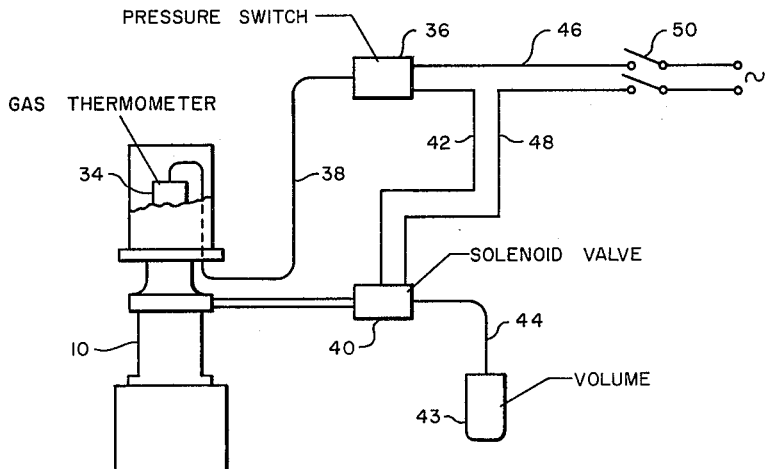
FIG. 1 is a diagrammatic view of the installation disclosing the gas thermometer temperature control for a Stirling type cold gas refrigerator.

Referring more particularly to FIG. 1 of the drawings, in which is shown a cold gas refrigerator 10 operating on the reversed Stirling cycle with a gas thermometer 34 located in the head thereof, the thermometer is connected to pressure switch 36 by means of a line 38. The pressure switch 36 is also connected to a solenoid valve 40 by means of a cable 42. The solenoid valve 40 communicates with the volume 43 by means of a line 44. The electric current supply has conductors 46 and 48 operating through a switch 50 and are connected to the pressure switch 36 and solenoid valve 40 respectively.

The operation of the present apparatus is as follows: The gas thermometer senses the temperature of the cold surface in the cold gas refrigerator 10. The change of the pressure in the gas thermometer 34 actuates a pressure switch 36 in the proper pressure range. The pressure switch 36 in turn actuates electrically the solenoid valve 40 mounted on the cylinder of the cold gas refrigerator and connected to its compression space.

An additional closed receptacle in the form of volume 43 is connected to the side of solenoid valve 40 and consequently when the solenoid valve 40 opens the compression space is connected through the solenoid valve to this additional volume. This construction diminishes the efficiency of the cold gas refrigerator and the temperature of the cold surface therein increases slightly. Subsequently, the pressure switch 36 opens the circuit of the solenoid valve 40 and the cold gas refrigerator then returns to its normal operating conditions.

It should also be noted that the pressure at which the pressure switch operates the solenoid valves can be adjusted so that the cold surface of the cold gas refrigerator can be maintained at any pre-selected temperature. This adjustment can be accomplished in two ways, i.e., by either taking different filling gases in the thermometers or by adjusting the mechanism of the pressure switch itself.

Figure 2:
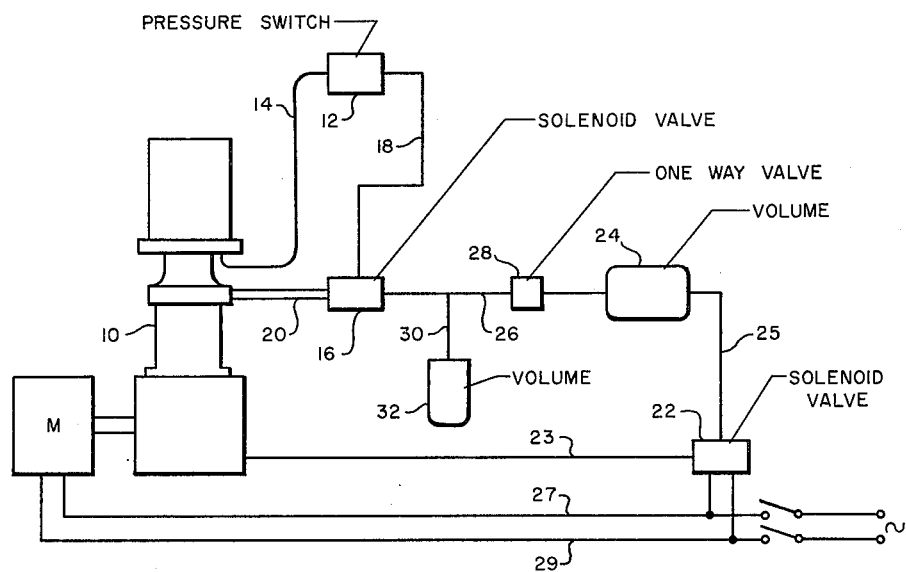
FIG. 2 is a diagrammatic view of the installation incorporating a Stirling type cold gas refrigerator.

Referring now to FIG. 2 of the drawing, the cold gas refrigerator operating on the reversed Stirling cycle principle bears the reference numeral 10. A temperature control pressure switch 12 is connected to refrigerator 10 by means of a line 14. The switch 12 is furthermore electrically connected to a temperature control solenoid valve 16 by means of an electric cable 18. The solenoid valve 16 is connected to the refrigerator through the lie 20. An additional, normally open solenoid valve 22 is connected to the refrigerator 10 and also the volume 24 through lines 23 and 25 respectively. The latter is connected by means of line 26 to the solenoid valve 16 through a one-way valve 28. Line 26 is split off to form a conduit 30 that connects to a conventional temperature control volume 32.

An electric line 27 and 29 connects the motor of the refrigerator 10 to a source of electric power. When the current of said power source is applied to the motor the solenoid valve 22 closes.

The operation of the installation shown in FIG. 2 is as follows: When the cold gas refrigerator 10 is started, the electric current actuates the solenoid valve 22 and closes the same. The helium pressure in the whole system is then equal. The cold gas refrigerator operates with a maximum helium pressure until the time when the temperature control opens the temperature control solenoid valve 16. The helium compressed by the movement of the piston in the cold gas refrigerator 10 flows through the one-way valve 28. After a short period the unloading volume 24 contains helium at higher pressure, trapped between the one-way valve 28 and the solenoid valve 22. The helium pressure in the cold gas refrigerator 10 automatically establishes itself at a lower level. When the refrigerator is stopped, the outlet solenoid valve 22 is de-energized causing the same to open and the helium pressure in the whole system is equalized and the system is ready to start up with maximum helium pressure again. Thus, helium pressure is adjusted automatically to the normal working condition of the system and maximum helium pressure is used for rapid cool-down.

Figure 3:
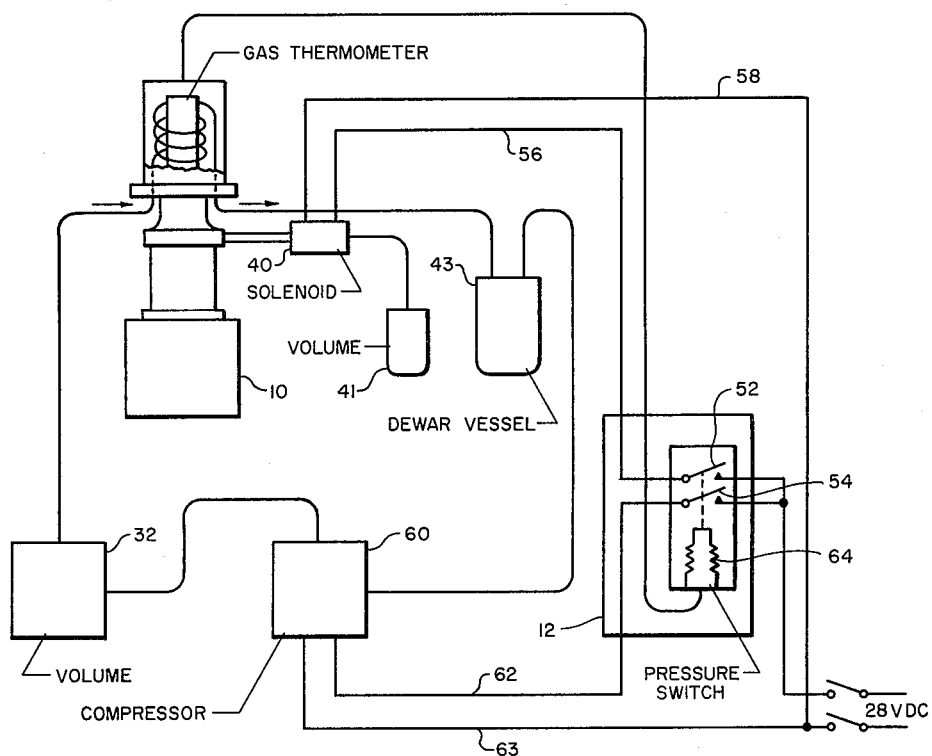
FIG. 3 is a diagrammatic view of a modification of the installation shown in FIG. 1.

FIG. 3 illustrates an alternative embodiment of the invention in which the temperature control pressure switch 12 incorporates two microswitches 52 and 54. One switch 52 is set for a lower temperature range and actuates the solenoid valve 40 by means of electrical lines 56 and 58 while the other switch 54 is set at a slightly higher temperature to actuate the recirculating compressor 60 through electrical lines 62, 63 and bellows 64. The solenoid valve 40 is connected to the refrigerator 10 and the volume or storage vessel 41. FIG. 3 discloses an intermittent two phase flow transfer by starting and stopping the recirculating compressor 60. This arrangement results in a temperature control using a double pressure switch 12 to first actuate the compressor 60 and improve the cool-down time and to adjust the flow of gas to cold production by intermittent actuation of the recirculating compressor 60. It should be noted that only one Dewar vessel 43 is illustrated but it is within the scope of the present invention to provide more than one Dewar vessel connected in parallel in the present system.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What I claim is:

1. A rapid cool-down system for cryogenic apparatus comprising a cold gas refrigerator having a working medium, a source of electric current, a first solenoid valve, a second temperature control solenoid valve, means for operating said second temperature control solenoid valve, a one-way valve, a first enclosure for a volume of said working medium, a plurality of lines connecting said first solenoid valve, second temperature control solenoid valve, one-way valve and first enclosure together, and a temperature control storage vessel connected into said lines between said second temperature control solenoid valve and said one-way valve, said first enclosure storing an amount of working medium in excess of the amount necessary to create the required pressure for operating said apparatus, said excess amount of working medium being admitted to said apparatus upon the operation of said first solenoid valve, and said second temperature control solenoid valve being operative at a determined time to permit the flow of said excess medium from said apparatus through said one-way valve into said first enclosure.

2. A rapid cool-down system for cryogenic apparatus as claimed in claim 1 wherein said means for operating said second temperature control solenoid valve is a temperature control pressure switch.

3. A rapid cool-down system for cryogenic apparatus comprising a cold gas refrigerator having a working medium, a source of electric current, a first solenoid valve, a second temperature control solenoid valve, a recirculating compressor, a double temperature control pressure switch with one of said switches being set for a lower temperature level to actuate said temperature control solenoid valve and the other switch being set at a higher temperature level to actuate said recirculating compressor, said first solenoid valve also being activated by said other switch at the higher temperature level, a one-way valve, a first enclosure for a volume of said working medium, a plurality of lines connecting said first solenoid valve, second temperature control solenoid valve, one-way valve and first enclosure together, and a temperature control volume connected into said lines between said second temperature control solenoid valve and said one way valve, said first enclosure storing an amount of working medium in excess of the amount necessary to create the required pressure for operating said apparatus, said excess amount of working medium being admitted to said apparatus upon the operation of said first solenoid valve and said second temperature control solenoid valve being operative at a pre-determined time to permit the flow of said excess medium from said apparatus through said one-way valve into said first enclosure.

4. A rapid cool-down system for cryogenic apparatus as claimed in claim 3 wherein said switch at the higher temperature level will automatically open said first solenoid valve and restore maximum working medium pressure in the cold gas refrigerator when the heat load becomes greater than the cold production.

5. A rapid cool-down system for cryogenic apparatus as claimed in claim 3 wherein said recirculating compressor is operated intermittently by said other switch in said double temperature control pressure switch to thereby adjust the flow of gas to cold production by intermittent actuation of said recirculating compressor.

6. A gas thermometer temperature control for a cold gas refrigerator having a working medium comprising a gas thermometer sensing the cold surface of said cold gas refrigerator, a pressure switch connected to said gas thermometer, a solenoid valve connected to said pressure switch and communicating with the compression space of the cold gas refrigerator, said pressure switch being actuated by a predetermined change of the pressure in said gas thermometer and said pressure switch in turn actuating said solenoid valve, a closed receptacle for a volume of said working medium connected to said solenoid valve, the latter, when operative, permitting a volume of said working medium in said cold gas refrigerator to escape to said closed receptacle thereby diminishing the efficiency of said cold gas refrigerator and maintaining the cold surface thereof at any pre-selected temperature.

References Cited by the Examiner
UNITED STATES PATENTS

| 2,824,430 | 2/1958 | Rinia | 62—6 |
| 2,867,973 | 1/1959 | Meyer | 60—24 |
| 3,036,427 | 5/1962 | Meyer | 60—24 |
| 3,101,596 | 8/1963 | Rinia | 62—6 |

WILLIAM J. WYE, *Primary Examiner.*